W. WICKERSHAM.
Making Cut Nails.
No. 28,928.
2 Sheets—Sheet 1.
Patented June 26, 1860.
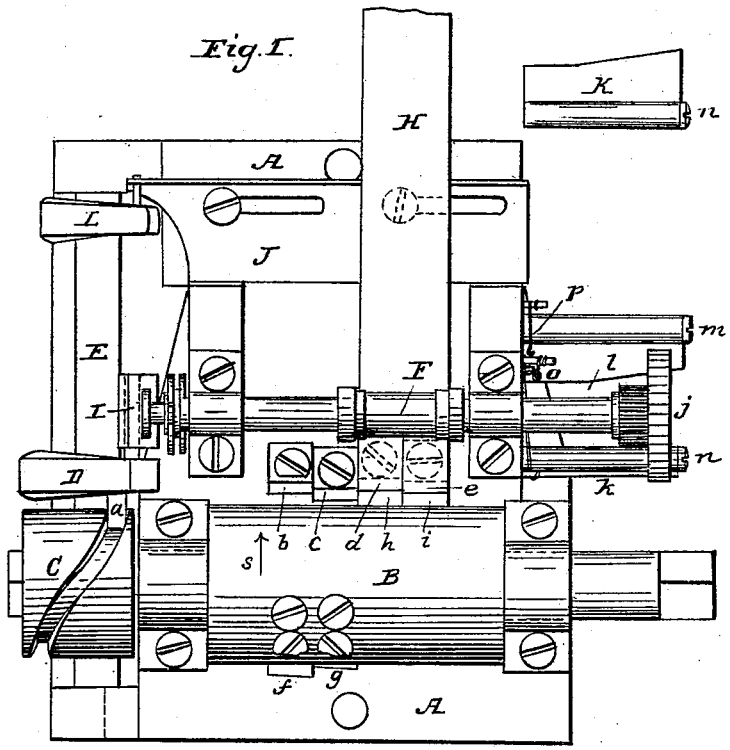
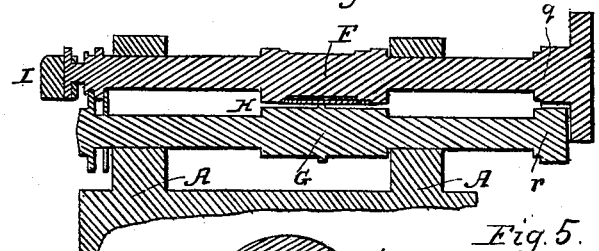
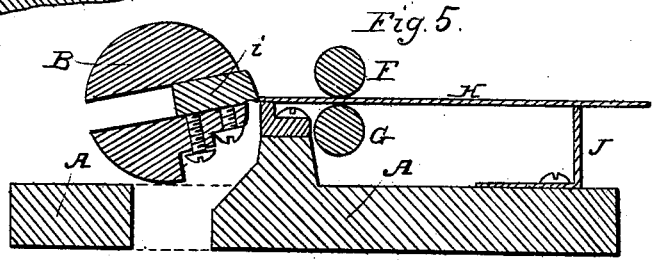
Witnesses:
Inventor:
William Wickersham W. WICKERSHAM.
Making Cut Nails.
No. 28,928.
2 Sheets—Sheet 2.
Patented June 26, 1860.
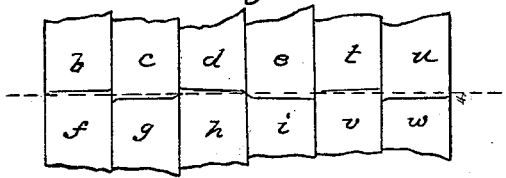
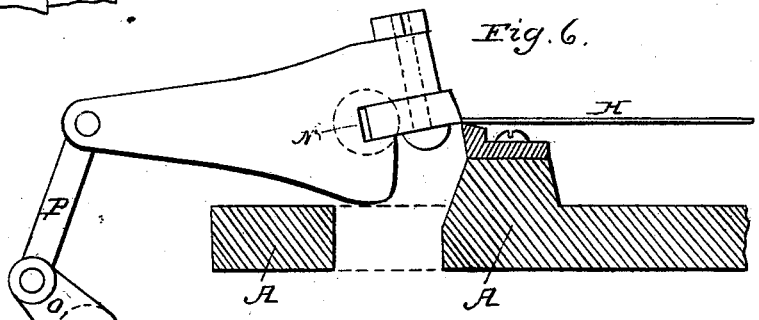
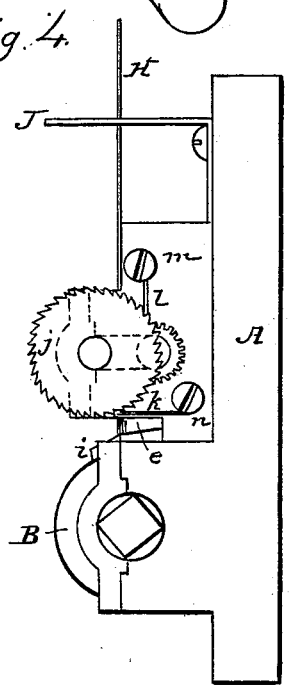
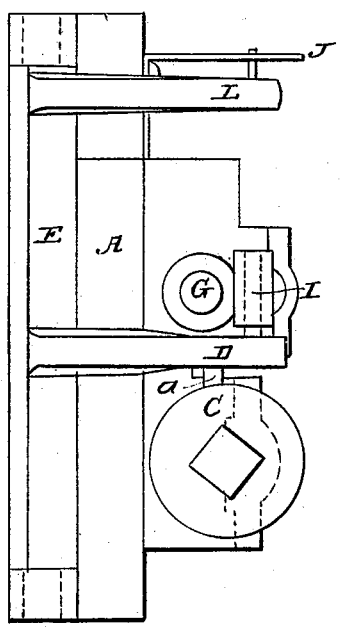
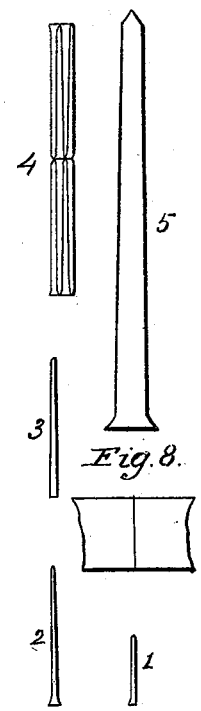
Witnesses:
Inventor:

UNITED STATES PATENT OFFICE.

WM. WICKERSHAM, OF BOSTON, MASSACHUSETTS.

NAIL-CUTTING MACHINE.

Specification of Letters Patent No. 28,928, dated June 26, 1860.

*To all whom it may concern:*

Be it known that I, WILLIAM WICKERSHAM, of Boston, in the county of Suffolk and State of Massachusetts, have invented a new and useful Improvement on the Nail-Cutting Machine; and I do hereby declare that the following is a full, clear, and exact description of the same, reference being had to the annexed drawings, making a part of this specification, in which—

(Figure 1) is a top view of my machine showing the cylinder containing the revolving cutters, the cam to shift the bar or sheet of metal from one set of cutters to another, the bed cutters feed motion, &c. (Fig. 2) is a side sectional view, showing several parts of the machine and especially the feed rolls which feed the sheets of metal into the machine to be cut into nails. (Fig. 3) is an end view of said machine. (Fig. 4) shows the opposite end to (Fig. 3). (Fig. 5) is a perpendicular sectional view passing through the sheet of iron and parallel to the length of it, showing the bed piece, the cylinder with one of its cutters, one of the bed cutters, and the two feed rolls. (Fig. 6) is a sectional view, similar to (Fig. 5) of a machine differently arranged. (Fig. 7) shows the plan of arranging the bed cutters relatively to the moving cutters. (Fig. 8) shows the form of the nails which are cut from a wide sheet of metal.

In describing my machine the same letters will designate the same parts in the different drawings in which—

(A) represents the cast iron bed or table to which the machinery is attached.

(B) is the cylinder which contains the rotary cutters.

(C) is a cam which moves the arm (D) on the shaft or axle (E) by means of the pin ($a$).

(F and G) are two rolls to feed the sheet of metal (H) into the machine as it is being cut into nails.

(I) is a connection of the arm (D) with the feed rolls (F and G).

(J) is a slide moving with the feed rolls, and supporting one end of the nail bar or sheet (H) so as to keep its position in one placed parallel to its position in other places.

($b\ c\ d$ and $e$) are four bed cutters screwed on to the bed of the machine, and so arranged that the rotary cutters ($f\ g\ h\ i$) will come close to their edges as the cylinder (B) turns around.

($k$ and $l$) are two plates of metal having one edge of each bent round so as to fit on to the rods or studs ($m$ and $n$); the other edge is made to incline at one end toward said rod and to fit into the notches of the ratchet gear ($j$).

($o$) is a spring to keep the plate ($k$) into the notches of the ratchet gear ($j$).

($p$) is a spring to keep the plate ($l$) into the ratchet gear ($j$).

Having designated the different parts of my machine, I will now explain its operation. Supposing the different parts of the said machine to be in the positions indicated by the drawings, the sheet of iron or other metal (H) is placed between the feed rolls (F and G) as shown in (Fig. 1) where a portion of the said sheet between the feed rolls and the cylinder (B) is made transparent in the drawings to show the positions of the bed cutters ($d$ and $e$). When the sheet (H) is thus placed, the cylinder (B) is turned in the direction indicated by the arrow point ($s$) by means of which the cutters ($h$ and $i$) are brought on to the metallic sheet (H) in such manner that the revolving cutter ($i$), as the cylinder (B) turns, will cut off a nail from said sheet, by passing through it, and close by the edge of the bed cutter ($e$) to cut the side of the nail, and close by the end edge of the cutter ($d$) to make the end of the nail.

Immediately after the cutter ($i$) cuts the sheet, the cutter ($h$) cuts off a nail by merely cutting the metal from one end to the other of the nail as the part of the metal was previously cut off which forms the end of the nail. By turning the cylinder (B) half around in the same direction, the edge of the cutter ($g$) comes down to and passes close by the edge of the bed cutter ($c$), and also the edge of the cutter ($f$) passes close by the bed cutter ($b$), but in the mean time, the cam (C) being fastened upon the same shaft, as the cylinder (B) has turned half around, and through the medium of the pin ($a$), the arm (D), and the connection (I), has moved the feed rolls (F and G) longitudinally so as to carry the nail sheet the distance of the width of two cutters, that is from its position in the drawings immediately over the bed cutters ($d$ and $e$) to a position immediately over the bed cutters (b and c), and its position when moved is kept parallel with its first position by means of a slide (J) which is moved by the arm (L) which is on the same shaft (E) with the arm (D) so that when the cutters (f and g) pass by the bed cutters (b and c) as above described, they cut off two nails from the sheet (H). But while the nail sheet (H) is moved from the position (d and e) to that of (b and c) it is also moved toward the cylinder (B) by means of the feed rolls (F and G) turning or rolling together while they are kept sufficiently close on each side of the sheet (H) as to grip it and move it as they turn. Said feed rolls are caused to work together by means of the two gears (q and r) on their ends working into each other. Outside of the gear (q) on the feed roll (F) is a ratchet gear (j).

There are two plates (k and l) arranged so that they will freely turn on their studs (m and n) by having one edge bent around the stud, and the other edge of each to work in the teeth of the ratchet gear (j). One of these plates (l) has the edge which works in the ratchet teeth inclined toward the stud at the end from the machine, that is, the end of said plate from the machine is as much narrower than the end next to it, as the width of a tooth in the ratchet gear (j), so that when the feed rolls are moved from the position shown in the drawings so as to carry the nail sheet (H) over the cutters (b and c), one of the teeth of the ratchet gear (j) is caused to slip along on the edge of the inclined plate (l) from the narrowest end to the widest, thereby causing the ratchet gear to turn the distance of one tooth which causes the feed rolls to feed the nail sheet in toward the cutters far enough for the width of a nail. In like manner after the nail bar has been moved to the position just described, and two nails been cut from it, as the cylinder (B) continues to turn, one tooth of the ratchet gear is caused to slip along on the edge of the plate (k) from the narrowest to the widest end, and thereby causing said ratchet gear, as it moves out from the machine to turn around one tooth, causing the feed rolls to feed the nail sheet in toward the cutters far enough for the width of a nail, when two more nails are cut as above described.

The middle of the edges of the cutters (c and e) should be the same distance from the cylinder (B). Also the middle of the edges of the cutters (b and d) should be the same distance from the cylinder (B), but the cutters (b and d) should be enough farther from the cylinder (B) than the cutters (c and e) to allow the cutters (f and h) to cut the metal off which forms one end of the nails cut off by the cutters (g and i) as shown in the drawings, when the sheet of metal is only wide enough for the length of two nails, but when the machine is extended so as to admit a sheet wide enough for the length of many nails, each alternate cutter in the cylinder is extended, as seen at (f h and v Fig. 7) so that the cutting edge is farther from the center of said cylinder than the intermediate cutters, and the cutters thus extended cut off the metal, forming the ends of all the nails which the machine cuts, except the out ends of those at the edge of the sheet. In this manner a broad sheet of metal may be cut into nails, without first being cut into strips. It will be seen that each cutter is a little inclined to the axis of the cylinder (B); this is to make the taper of the nail. The part of the sheet of metal which is cut off even with the edge of the cutter (e), is carried to the cutter (c), the edge of which has the same inclination to the cylinder as the cutter (e), though a reverse inclination. Nails are then cut by the revolving cutters,—so that one half of the taper of the nail is made by the cutter which cuts off each side of it.

At (Fig. 6) is a sectional view of a machine arranged in some respects differently from that shown at (Fig. 5). Instead of the moving cutters being fixed in a revolving cylinder, they are placed in the end of lever (N) which has a vibratory movement, and turns on the fulcrum or bearing indicated by the dotted circular line about the letter (N). This motion is given to the lever by the crank (O) through the connection rod (P), or any other suitable means. In this machine the bed cutters are arranged as shown at (b c d e t u Fig. 7) just as they are in the machine first described, with two additional ones, and those (f g h i v w) fastened in the lever (N) are made to match them. The dark or shaded part which covers over the bed cutters (b c d and e) represents the metallic sheet off of which has been cut a series of four nails by the cutters (f g h i). On the raising up of the moving cutters the said sheet is moved laterally in the direction of the dotted line (H) till it is over the bed cutters (d e t u) and passed toward the moving cutters far enough for the width of a nail and then the moving cutters come down, and four of them (h i v w) cut off four more nails. The machine first described, makes a nail like the one shown example 3 (Fig. 8) with a square point and without a head. But by making the cutters as shown at (Fig. 7) nails are cut as seen at (Fig. 8) examples 1, 2 and 5. Example 4 shows how a wide sheet is cut into nails of that form.

After having thus described my invention what I claim and desire to secure by Letters Patent is—

1. The within described mechanism in nail cutting machines for shifting or moving laterally the sheet of metal or material to be cut into nails the distance of the length of two nails or more if desired for each series of nails cut from said sheet substantially as described.

2. Feeding the material to be cut into nails far enough toward the cutters for the width of a nail while it is moving laterally substantially as described.

WILLIAM WICKERSHAM.

Witnesses:
W. A. FIELD,
A. D. PARKER.